United States Patent
Rinkinen et al.

(10) Patent No.: US 10,613,596 B2
(45) Date of Patent: Apr. 7, 2020

(54) FOLDABLE COMPUTER

(71) Applicant: Unevn Oy, Espoo (FI)

(72) Inventors: Santeri Rinkinen, Espoo (FI); Aleksi Rinkinen, Espoo (FI)

(73) Assignee: Unevn Oy, Espoo (FI)

( * ) Notice: Subject to any disclaimer, the term of this patent is extended or adjusted under 35 U.S.C. 154(b) by 0 days.

(21) Appl. No.: 16/339,162

(22) PCT Filed: Oct. 10, 2017

(86) PCT No.: PCT/EP2017/075770
§ 371 (c)(1),
(2) Date: Apr. 3, 2019

(87) PCT Pub. No.: WO2018/069293
PCT Pub. Date: Apr. 19, 2018

(65) Prior Publication Data
US 2019/0243429 A1    Aug. 8, 2019

(30) Foreign Application Priority Data
Oct. 14, 2016   (EP) ..................... 16193828

(51) Int. Cl.
*G06F 1/18* (2006.01)
*A47B 85/00* (2006.01)
(Continued)

(52) U.S. Cl.
CPC .............. *G06F 1/182* (2013.01); *A47B 3/083* (2013.01); *A47B 21/02* (2013.01); *A47B 21/04* (2013.01);
(Continued)

(58) Field of Classification Search
CPC .... G06F 1/1601; G06F 1/1692; G06F 1/1626; G06F 3/044; G06F 1/16; G06F 1/1628; G06F 1/1641; G06F 1/181; G06F 1/20; G06F 1/1613; G06F 1/1618; G06F 1/1647; G06F 1/1684; G06F 1/182; G06F 1/184;
(Continued)

(56) References Cited

U.S. PATENT DOCUMENTS 5,961,192 A * 10/1999 Bernart .................. A47B 21/00
                                                                108/60
6,012,788 A *  1/2000 Marschand ............ A47B 21/00
                                                                108/25
(Continued)

FOREIGN PATENT DOCUMENTS

| CN | 201452100 U | * | 5/2010 |
| CN | 205214716 U |   | 5/2016 |
| EP | 2674056 A1 |   | 12/2013 |

OTHER PUBLICATIONS

CN201452100—Machine Translation (Year: 2010).*
(Continued)

*Primary Examiner* — Jinhee J Lee
*Assistant Examiner* — Ingrid D Wright
(74) *Attorney, Agent, or Firm* — Ziegler IP Law Group, LLC

(57) ABSTRACT

A computer including a desk portion with a first part and a second part pivotally connected to each other; a set of foldable legs connected to the desk portion; and a computer hardware integrated into the desk portion by damping means.

11 Claims, 18 Drawing Sheets

(51) Int. Cl.
*G06F 1/16* (2006.01)
*A47B 3/083* (2006.01)
*A47B 21/02* (2006.01)
*A47B 21/04* (2006.01)
*G06F 1/20* (2006.01)

(52) U.S. Cl.
CPC ............ *A47B 85/00* (2013.01); *G06F 1/1601* (2013.01); *G06F 1/1613* (2013.01); *G06F 1/1628* (2013.01); *G06F 1/181* (2013.01); *G06F 1/20* (2013.01); *A47B 2200/0056* (2013.01); *A47B 2200/0073* (2013.01); *A47B 2200/06* (2013.01); *G06F 1/184* (2013.01); *G06F 1/188* (2013.01)

(58) Field of Classification Search
CPC . G06F 1/188; A47B 21/02; A47B 2200/0073; A47B 3/002; A47B 21/04; A47B 2200/0056; A47B 2200/06; A47B 3/083; A47B 43/00; A47B 85/00
USPC .............. 361/679.3, 679.55, 679.27, 679.02, 361/679.16, 679.6; 248/186.6
See application file for complete search history.

(56) References Cited

U.S. PATENT DOCUMENTS

| | | | |
|---|---|---|---|
| 2004/0173996 A1 | 9/2004 | Anderson | |
| 2008/0072801 A1* | 3/2008 | Korber | A47B 21/0073 108/7 |
| 2012/0085267 A1* | 4/2012 | Kenny | A47B 9/16 108/20 |
| 2016/0286951 A1* | 10/2016 | Chung | A47B 9/16 |

OTHER PUBLICATIONS

International Search Report and Written Opinion of the International Searching Authority, Application No. PCT/EP2017/075770, dated Jan. 17, 2018, 13 pages.

* cited by examiner

US 10,613,596 B2

FOLDABLE COMPUTER

TECHNICAL FIELD

The aspects of the disclosed embodiments relate generally to a computer, and more specifically, a computer that can be easily transported from one place to another.

BACKGROUND

Many computing devices that are being used nowadays such as laptops, tablets, and mobile phones are light and portable. However, despite the increase in processing power in such devices they still are not capable of running highly computationally intensive applications such as compiling heavy code, processing multimedia files, high definition (HD) 3 dimensional (3D) gaming etc. At events such as hackathons (e.g. coding competitions), gaming competitions etc, users have to carry their own computers to the event venue. The computers used in such events are typically heavy-duty desktop computers with large calculation power, fast graphics cards and high definition large displays to deliver an immersive and real-time experience. They are expensive and somewhat bulky, and hence it is particularly important to ensure that they are not damaged during relocation. Transportation of these computers along their accessories (e.g. a keyboard, a mouse etc.) from one place to another place is cumbersome and time consuming since each of the units has to be packed and carried separately in special cases and boxes. Further, at an event venue, the user may require separate tables to arrange the computer and its accessories.

Therefore, in view of aforementioned problems and drawbacks associated with existing computers, there exists a need to address, for example to overcome, the aforementioned drawbacks in existing desktop computers and arrangements that make it highly inconvenient for users to carry the computers and their accessories from one place to another.

SUMMARY

The present disclosure provides a computer comprising:
a desk portion comprising a first part and a second part pivotally connected to each other;
a set of foldable legs connected to the desk portion; and
a computer hardware integrated into the desk portion by damping means.

Embodiments of the present disclosure substantially eliminate or at least partially address the aforementioned problems in the prior art, and enable folding the computer, like a bag, to carry and transport from one place to another and unfolding the computer to use as a desk for supporting the computer hardware and its accessories.

Additional aspects, advantages, features and objects of the present disclosure are made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
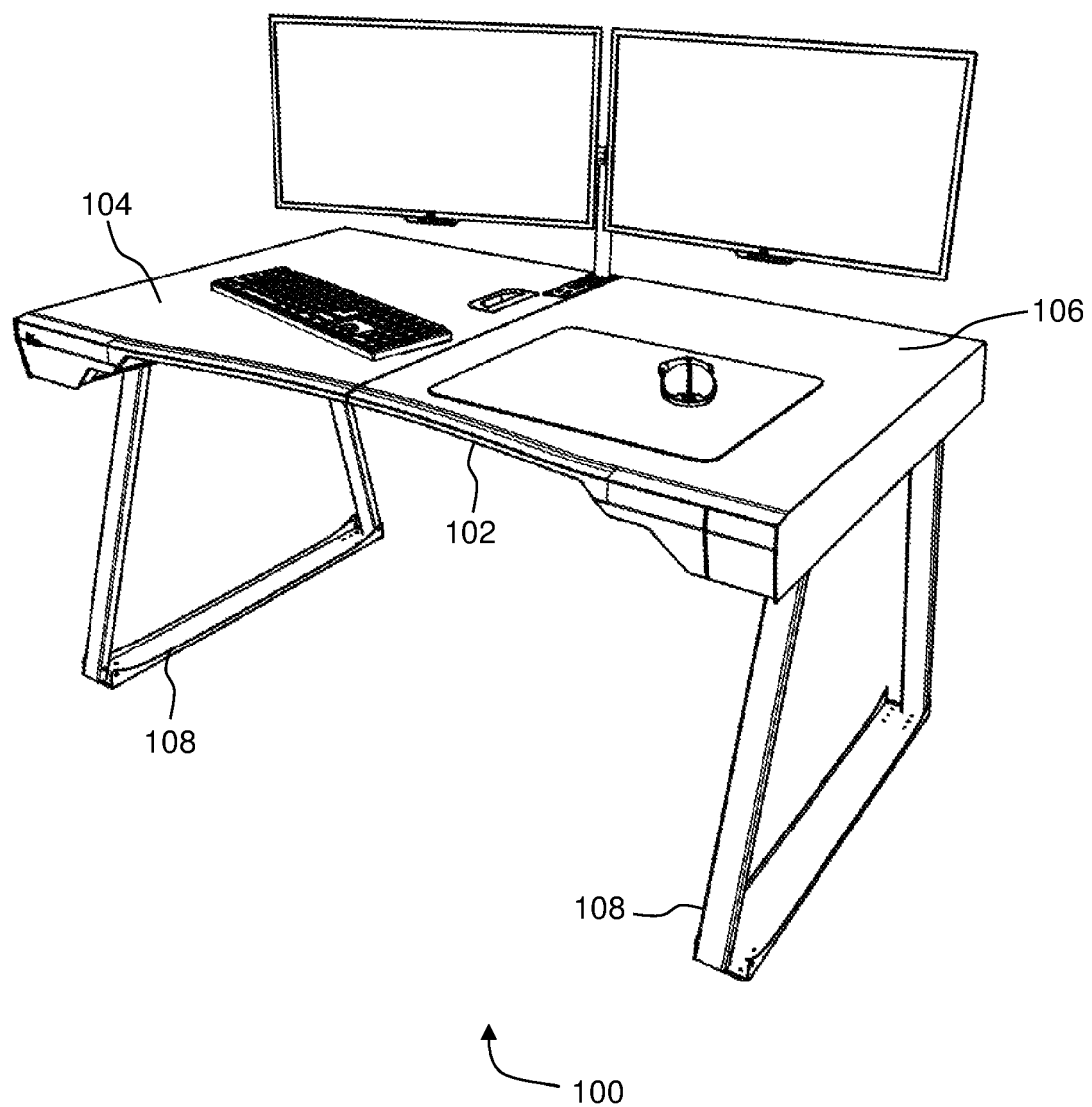
FIG. 1 is a perspective view of a computer in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The present disclosure provides a computer comprising
 a desk portion comprising a first part and a second part pivotally connected to each other;
 a set of foldable legs connected to the desk portion; and
 a computer hardware integrated into the desk portion by damping means.

The computer is thus integrated into the desk portion, i.e. the present device is not a combination of a separate computer and a desk but a computer integrated into a desk. This also means that the computer hardware is integrated into either the first part or the second part of the desk portion. In some embodiments, some parts of the computer hardware may be integrated into the first part of the desk portion while other parts of the computer hardware may be integrated into the second part of the desk portion.

The computer may be a highly configured desktop computer having high processing capability, a fast graphics card and a large high definition large display. It may be used in gaming and other such events that may require heavy-duty computers. It can be folded like a bag, to carry and transport it from one place to another with ease. The computer may be unfolded to use as a table or a desk for supporting the computer hardware and its accessories. The computer may comprise a separate storage for storing the computer hardware, its accessories (e.g. a keyboard, a mouse or power cables etc.) and a display (e.g. a large high definition monitor). The computer may comprise a space under the desk portion to accommodate the user's legs.

In an embodiment, the first part and the second part of the desk portion may be pivotally connected to each other using a hinge. The first part and the second part of the desk portion may be pivotally connected to each other using a bolt, glue or any suitable attachment means. The first part and the second part of the desk portion may comprise a space for storing the computer hardware and its accessories respectively. For example, the first part may comprise a large space for the computer hardware as the configuration of the computer hardware may vary depending on its purpose (e.g. for gaming or browsing etc.). The first part of the desk portion may comprise an On/Off button and Universal Serial Bus (USB) connector points. In another embodiment, the second part of the desk portion comprises an On/Off button and Universal Serial Bus (USB) connector points.

The first part and/or the second part of the desk portion may comprise a handle to adjust a height of the desk portion. In an embodiment, the handle in the first part and/or the second part of the desk portion may be used to fold or unfold the desk portion. In one embodiment, the first part and the second part of the desk portion and the set of foldable legs may be made of steel, wood or composite material, for example comprising mica or fibers. The set of foldable legs may be electric legs.

In an embodiment, the computer may comprise a third part, which may be pivotally connected to the first part or the second part. The third part may comprise a space for storing the computer hardware or its accessories.

According to an embodiment, the desk portion has a first operational state, wherein the first part and the second part are in a closed position with respect to each other and the foldable legs are folded. In another embodiment, the desk portion has a second operational state, wherein the first part and the second part are in an opened (i.e. open) position with respect to each other and the foldable legs are unfolded. In the first operational state, the first part and the second part of the desk portion may be used as a storage device or a cabinet when the first part and the second part are in the closed position. In the second operational state, the first part and the second part of the desk portion may be used as a table or a desk when the first part and the second part are in the open position. When the desk portion is in the first operational state, the computer may be used as a cabinet and may be easily carried around like a bag. When the desk portion is in the second operational state, the computer may be used as a table to support the computer hardware, its accessories and the display.

According to another embodiment, the first part of the desk portion comprises at least one input for air and at least one output for air. According to yet another embodiment, the at least one output for air is positioned opposite to the first part of the desk portion with respect to the at least one input for air. The at least one input for air may accommodate at least one input fan. The at least one input fan may circulate air inside the computer. The at least one output for air may accommodate at least one output fan. The at least one output fan may dispel air from the computer outside. The air inputs and outputs may alternatively or additionally be arranged in the second part of the desk portion.

According to yet another embodiment, the computer hardware comprises at least one of a motherboard of the computer, at least one fan, a power supply, at least one input and at least one output. According to an embodiment, these input(s) and output(s) may be arranged in the first part and/or in the second part of the desk portion. The input(s) and output(s) may be for example ports, such as Universal Serial Bus (USB) ports or High-Definition Multimedia Interface (HDMI) ports. They may also be transmitters/receivers for wireless communication.

Figure 3:
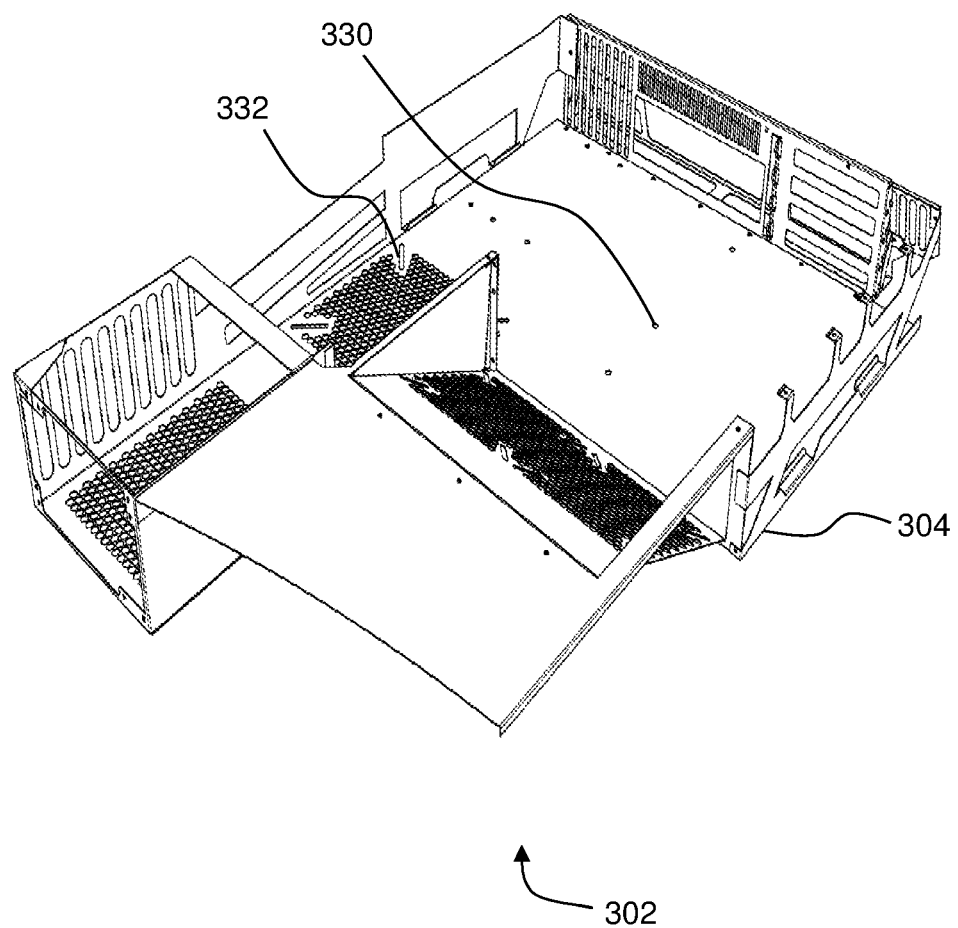
FIG. 3 is an exploded view of a first part of a desk portion in accordance with an embodiment of the present disclosure.

The computer hardware is integrated into the desk portion by damping means 430 (of FIG. 4.) and 330, 332 (of FIG. 3). The computer hardware may be attached to the first part of the desk portion using bolts, hinges, rivets or adhesive materials (e.g. glue). The damping means may be a viscous fluid or elastic pads or similar. In an embodiment, the computer hardware may be attached to the second part of the desk portion. The at least one fan may dissipate the heat generated inside the computer hardware.

According to yet another embodiment, the set of foldable legs comprises a linear guideline 1230 (of FIG. 12) for unfolding the set of foldable legs to support the desk portion. The linear guideline of the set of foldable legs may be attached to the desk portion using bolts, rivets, glue etc. The set of foldable legs comprises a holder for holding the set of foldable legs when in an unfolded state. The linear guideline of the set of foldable legs may be used to fold the set of foldable legs.

According to yet another embodiment, the set of foldable legs further comprise a set of tension springs for helping the linear guideline to unfold the set of foldable legs. The set of tension springs gets compressed when the set of foldable legs are folded. The set of tension springs gets decompressed when the set of foldable legs are unfolded. Energy is thus stored in the tension springs when the foldable legs are folded, i.e. the computer is stored away to the first operational state, and thus this energy may be used to unfold the legs when the computer is again used in the second operational state.

According to yet another embodiment, the computer further comprises attachment means for releasably attaching a display. The attachment means may be an attachment part, such as a snap joint or the like. The display may be attached to the computer using the attachment part. In an embodiment, the attachment part has a first end to connect to the display and a second end to connect to the first part of the computer. In an embodiment, the computer further comprises a slot to accommodate the attachment part, and the attachment part connects the computer hardware to the display.

According to yet another embodiment, the first part of the desk portion comprises attachment means for the computer hardware and the second part of the desk portion comprises a storage space for storing accessories and a display. The computer hardware may be attached to the first part of the desk portion by the attachment means. The attachment means may be any suitable means, such as hinges, screws, rivets, nails, belts, straps or adhesive materials (e.g. glue). The second part of the desk portion may comprise the storage space to store the accessories and the display. In an embodiment, the first part of the desk portion comprises the storage space to store the accessories and the display when the second part of the desk portion comprises the attachment means for the computer hardware. In an embodiment, the display is a liquid crystal display (LED), a light emitting diode (LED) display, a cathode ray tube (CRT) etc. The display may comprise a touch-enabled screen that supports user input.

According to an embodiment, in the first operational state, the set of foldable legs are folded inside a volume formed by the first part and the second part when in the closed position. According to yet another embodiment, the computer is arranged to be used for computing in the first operational state and in the second operational state.

According to yet another embodiment, the computer further comprises a foldable display unit integrated into the desk portion, wherein the foldable display unit comprises
  a display,
  a foldable arm comprising a first end and a second end, wherein the first end of the foldable arm is attached to the display and the second end of the foldable arm is attached to the desk portion, and
  a cover attached to the first end of the foldable arm for locking the display inside a cavity of the desk portion.

In an embodiment, the cavity is present in the second part of the desk portion. In another embodiment, the cavity is present in the first part of the desk portion. The first end of the foldable arm may be pivotally attached to the display using a pivoting joint or the like. In an embodiment, the display is releasably attached to the first end of the foldable arm using an attachment part, such as a snap joint or the like.

The second end of the foldable arm may be attached to the first part or the second part of the desk portion.

In an embodiment, the second end of the foldable arm is attached to the first part or the second part of the desk portion using bolts, hinges, rivets or adhesive materials (e.g. glue). In an embodiment, the second end of the foldable arm is attached to other parts of the desk portion. The second end of the foldable arm may comprise a rotatable means to attach to the first part or the second part of the desk portion for adjusting the display to different directions.

According to yet another embodiment, the foldable display unit is folded inside the cavity of the desk portion when the desk portion is in the first operational state. In other words, the foldable display unit is in a folded state when the desk portion is in the first operational state. In another embodiment, the foldable display unit is unfolded from the cavity of the desk portion when the desk portion is in the second operational state. In other words, the foldable display unit is in an unfolded state when the desk portion is in the second operational state.

In an embodiment, the cover comprises a locking means to lock the display inside the cavity of the desk portion when the computer is in the first operational state. The foldable display unit may be unfolded/expanded out from the cavity of the desk portion by pressing the locking means in the cover. The locking means may be a retractable push button or the like. The locking means may prevent accidental unfolding of the display from the cavity of the desk portion during transportation.

According to yet another embodiment, the set of foldable legs comprises a pair of electric legs, wherein the pair of electric legs comprises
  an electric motor for folding and unfolding the pair of electric legs; and
  an electrically adjustable linear guideline, controlled by the electric motor, for adjusting a height of the desk portion.

In an embodiment, the computer comprises a switch for controlling the electric motor to fold and unfold the electric legs and to adjust the height of the desk portion. The power supply may supply power to the electric motor. The electric legs may comprise an electrically adjustable linear guideline. In an embodiment, the electric motor controls the electrically adjustable linear guideline to adjust the height of the desk portion to different heights. In an embodiment, the computer comprises an electric motor and the electric motor is electrically connected to the electric legs for folding and unfolding the electric legs.

According to yet another embodiment, the pair of electric legs are folded inside a volume formed by the first part and the second part of desk portion when the desk portion is in the first operational state. In an embodiment, the pair of electric legs are unfolded from desk portion when the desk portion is in the second operational state. When the desk portion is in the first operational state, the first part and the second part of the desk portion are in a closed position with respect to each other, and the pair of electric legs are folded. When the desk portion is in the second operational state, the first part and the second part of the desk portion are in an open position with respect to each other, and the pair of electric legs are unfolded.

Embodiments of the present disclosure may enable the computer to be folded like a bag and used as a cabinet to carry and transport the computer hardware, its accessories and the display from one place to another. For example, the embodiments may be unfolded and used as a table or a desk for supporting the computer hardware, its accessories and the display. The embodiments may comprise a storage space to store the computer hardware, its accessories (e.g. a keyboard, a mouse or power cables etc.) and the display. The computer may also comprise wheels for transportation. Likewise, the computer may comprise a handle and/or a strap for carrying it.

DETAILED DESCRIPTION OF THE DRAWINGS

FIG. 1 is a perspective view of a computer 100 in accordance with an embodiment of the present disclosure. The computer 100 comprises a desk portion 102 and a set of foldable legs 108. The desk portion 102 comprises a first part 104 and a second part 106. The first part 104 and the second part 106 are pivotally connected to each other. The set of foldable legs 108 are connected to the desk portion 102 of the computer 100. The first part 104 of the desk portion 102 comprises computer hardware. The second part 106 of the desk portion 102 comprises a storage space for storing accessories and a display.

Figure 2:
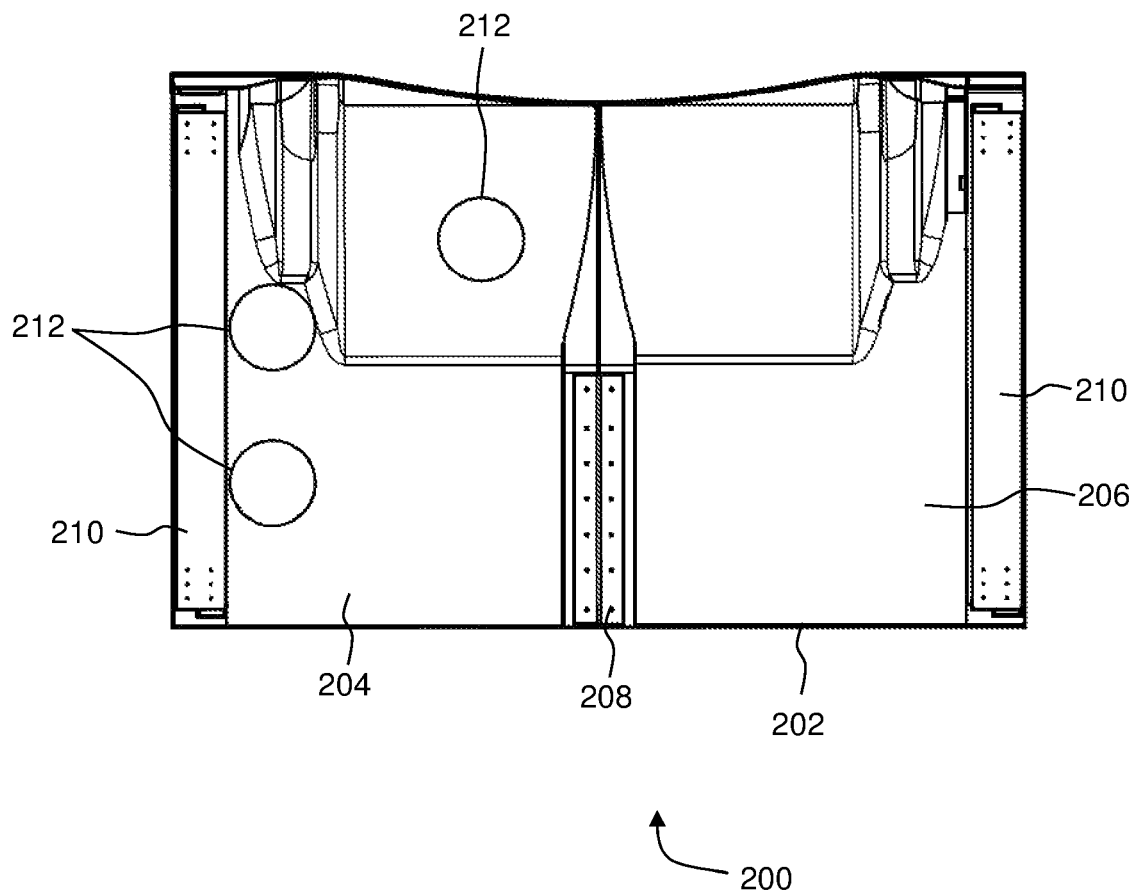
FIG. 2 is a bottom view of a computer in accordance with an embodiment of the present disclosure.

FIG. 2 is a bottom view of a computer 200 in accordance with an embodiment of the present disclosure. The computer 200 comprises a desk portion 202, a hinge 208 and a set of foldable legs 210. The desk portion 202 comprises a first part 204 and a second part 206. The first part 204 and the second part 206 are pivotally connected to each other using the hinge 208. In this embodiment, the hinge 208 comprises several slots. Screws may be inserted into the slots of the hinge 208 to attach the hinge 208 to the first part 204 and the second part 206 of the desk portion 202. The set of foldable legs 210 enable the desk portion 202 of the computer 200 to stay in its position. The first part 204 comprises at least one input for air 212. The at least one input for air 212 accommodates at least one fan that circulates air inside the computer 200.

FIG. 3 is an exploded view of a first part 304 of a desk portion 302 in accordance with an embodiment of the present disclosure. The first part 304 of the desk portion 302 comprises a space to accommodate a computer hardware.

Figure 4:
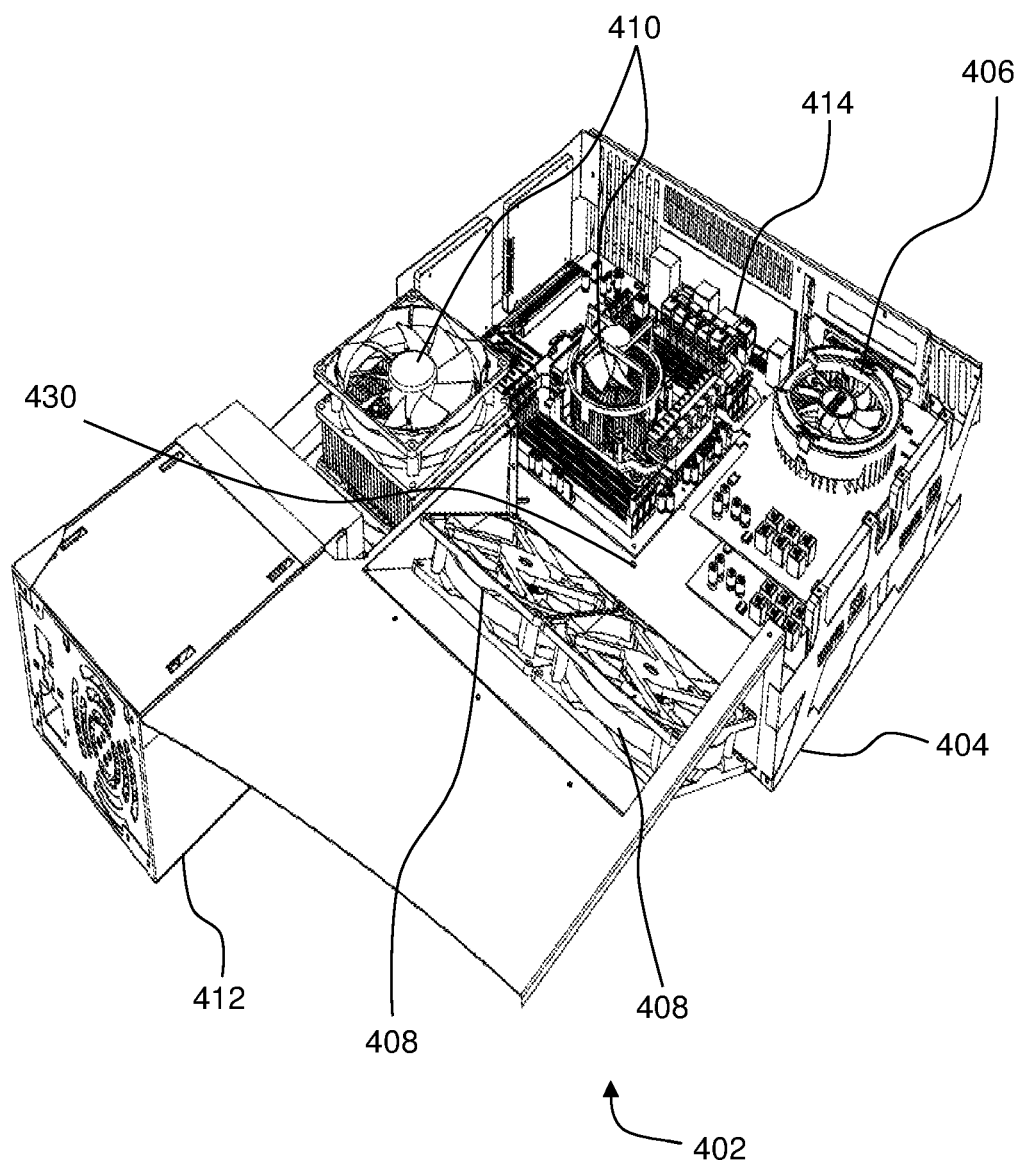
FIG. 4 is an exploded view of a first part of a desk portion that comprises a computer hardware in accordance with an embodiment of the present disclosure.

FIG. 4 is an exploded view of a first part 404 of a desk portion 402 that comprises a computer hardware 414 in accordance with an embodiment of the present disclosure. The first part 404 of the desk portion 402 comprises at least one input for air to accommodate at least one input fan 408, at least one output for air to accommodate at least one output fan 406, at least one fan 410 and a power supply 412. The at least one input fan 408 is positioned in a front side of the first part 404. The at least one input fan 408 circulates air inside the computer hardware 414. The at least one output fan 406 is positioned in a rear side of the first part 404 and is tilted slightly upwards. The at least one output fan 406 dispels air from the computer hardware 414 to the outside. The at least one fan 410 dissipates heat generated inside the computer hardware 414. The power supply 412 supplies power to the computer hardware 414 and its accessories.

Figure 5:
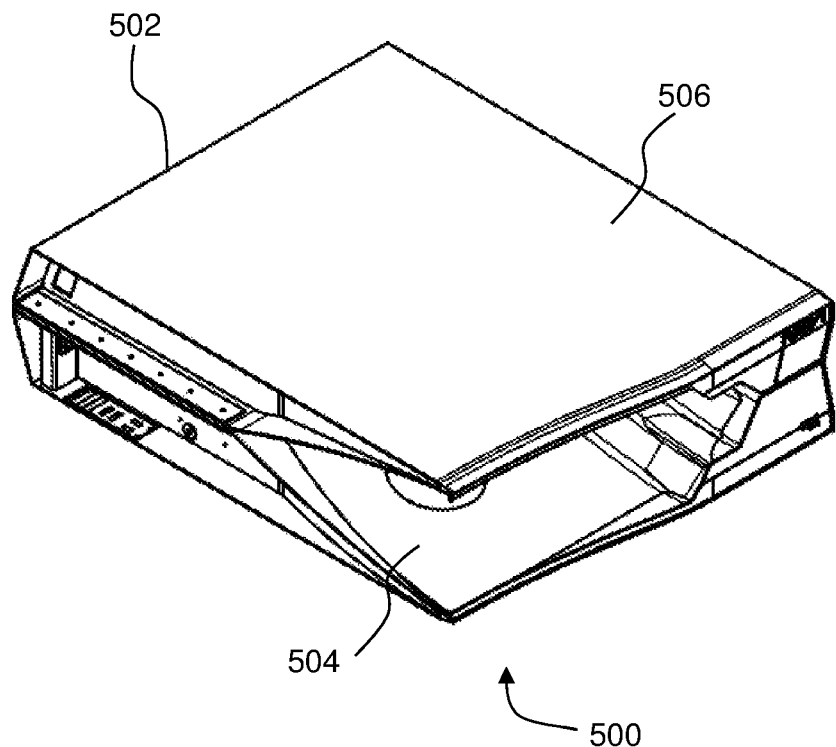
FIG. 5 is a perspective view of a computer comprising a desk portion that has a first operational state in accordance with an embodiment of the present disclosure.

FIG. 5 is a perspective view of a computer 500 comprising a desk portion 502 that is in a first operational state in accordance with an embodiment of the present disclosure. The desk portion 502 comprises a first part 504 and a second part 506. In this first operational state, the first part 504 and the second part 506 of the desk portion 502 are in a closed position with respect to each other, and a set of foldable legs are folded. The set of foldable legs are folded inside a volume formed by the first part 504 and the second part 506 of the desk portion 502 when the computer is in a closed position (e.g. the first operational state).

Figure 6:
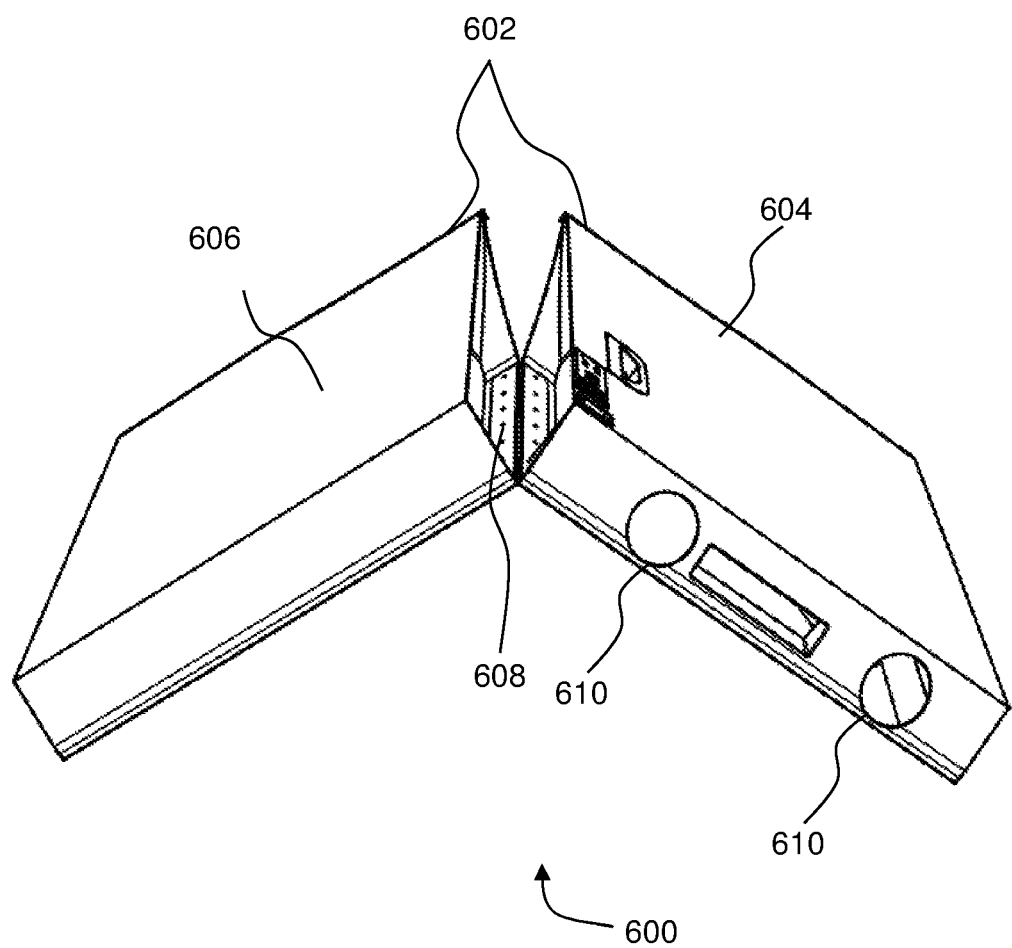
FIG. 6 is a perspective view of a desk portion of a computer that is in a partially open position in accordance with an embodiment of the present disclosure.

FIG. 6 is a perspective view of a desk portion 602 of a computer 600 that is in a partially open position in accordance with an embodiment of the present disclosure. The desk portion 602 comprises a first part 604, a second part 606, a hinge 608 and at least one output for air 610. The first part 604 and the second part 606 of the desk portion 602 are in a partially open position. The first part 604 and the second part 606 are attached to each other using the hinge 608. The at least one output for air 610 is positioned on a rear side of the first part 604. The at least one output for air 610 may be positioned on a side opposite to the first part 604 of the desk portion 602 with respect to at least one input for air. The at least one output for air 610 accommodates at least one output fan that dispels air from the computer 600 outside.

Figure 7:
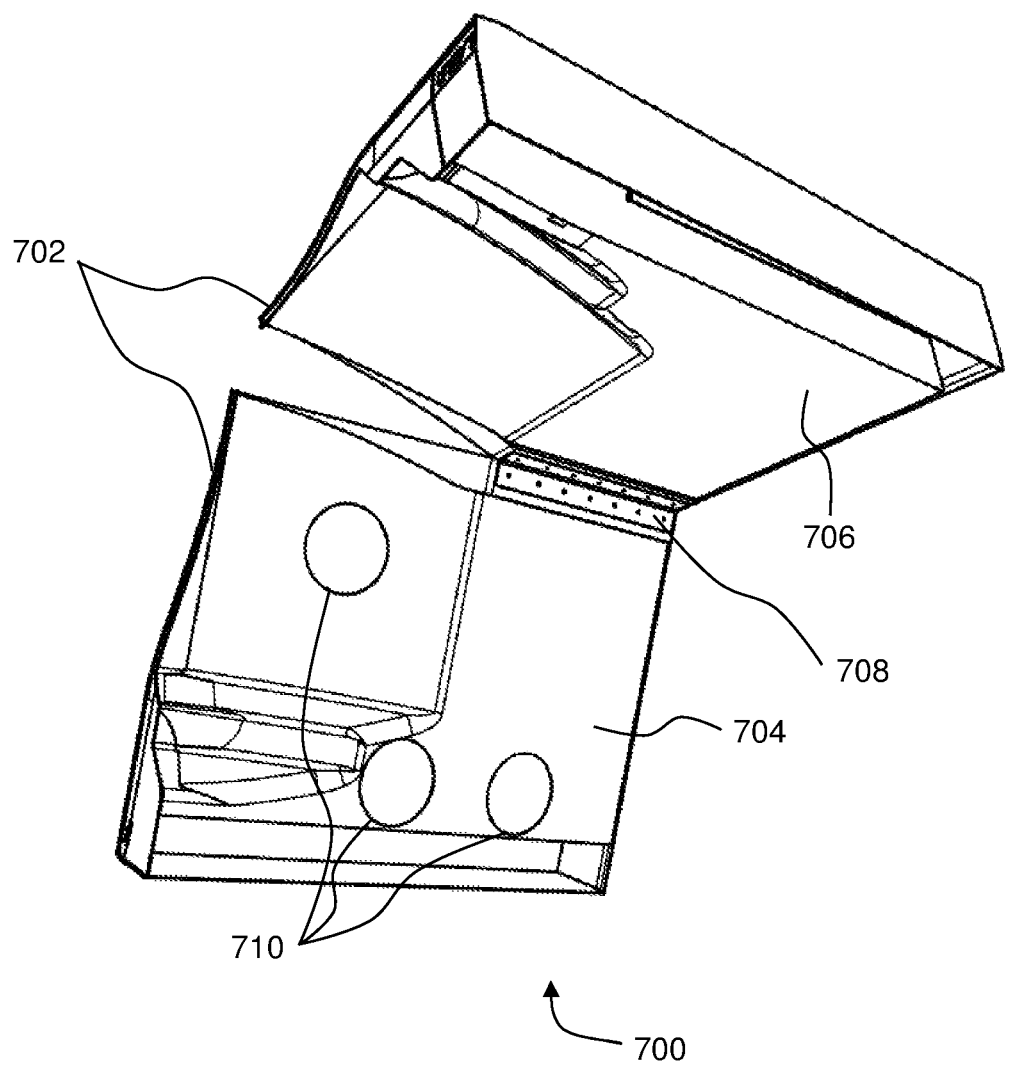
FIG. 7 is a bottom view of a desk portion of a computer that is in a partially open position in accordance with an embodiment of the present disclosure.

FIG. 7 is a bottom view of a desk portion 702 of a computer 700 that is in a partially open position in accordance with an embodiment of the present disclosure. The desk portion 702 comprises a first part 704, a second part 706, a hinge 708 and at least one input for air 710. The function and arrangement of these parts are as has been described above.

Figure 8:
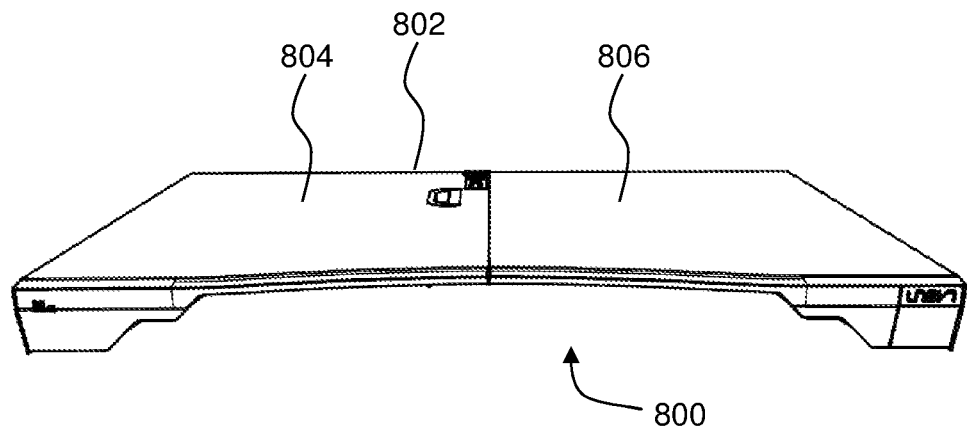
FIG. 8 is a perspective view of a desk portion of a computer that is in an open position in accordance with an embodiment of the present disclosure.

FIG. 8 is a perspective view of a desk portion 802 of a computer 800 that is in an open position in accordance with an embodiment of the present disclosure. The desk portion 802 comprises a first part 804 and a second part 806. The first part 804 and the second part 806 of the desk portion 802 are in a fully open position.

Figure 9:
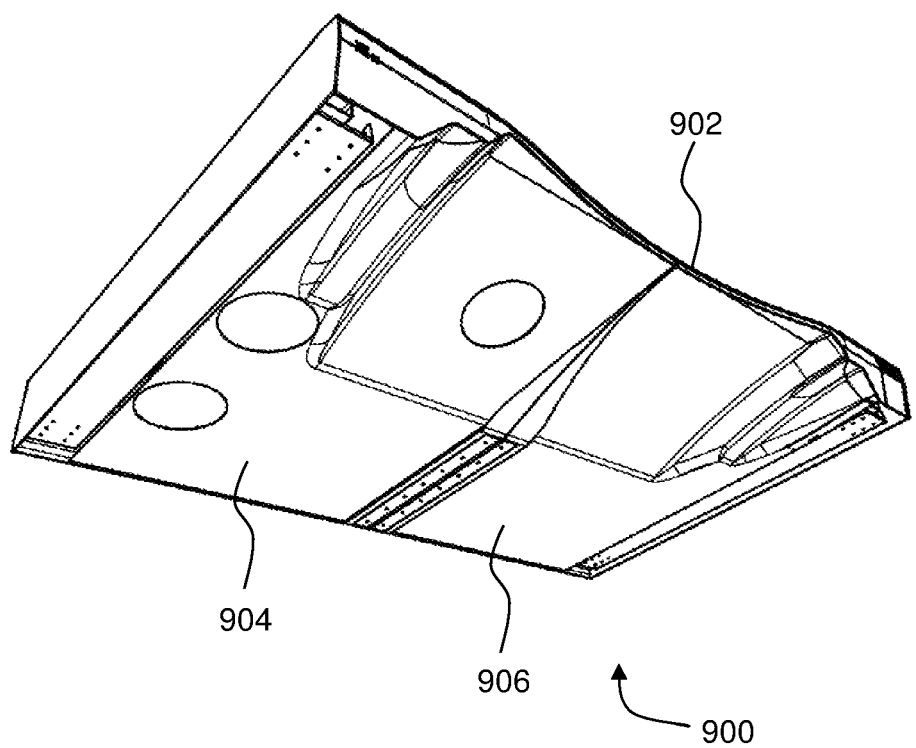
FIG. 9 is a bottom view of a desk portion of a computer that is in an open position in accordance with an embodiment of the present disclosure.

FIG. 9 is a bottom view of a desk portion 902 of a computer 900 that is in an open position in accordance with an embodiment of the present disclosure. The desk portion 902 comprises a first part 904 and a second part 906. The first part 904 and the second part 906 of the desk portion 902 are in a fully open position.

Figure 10:
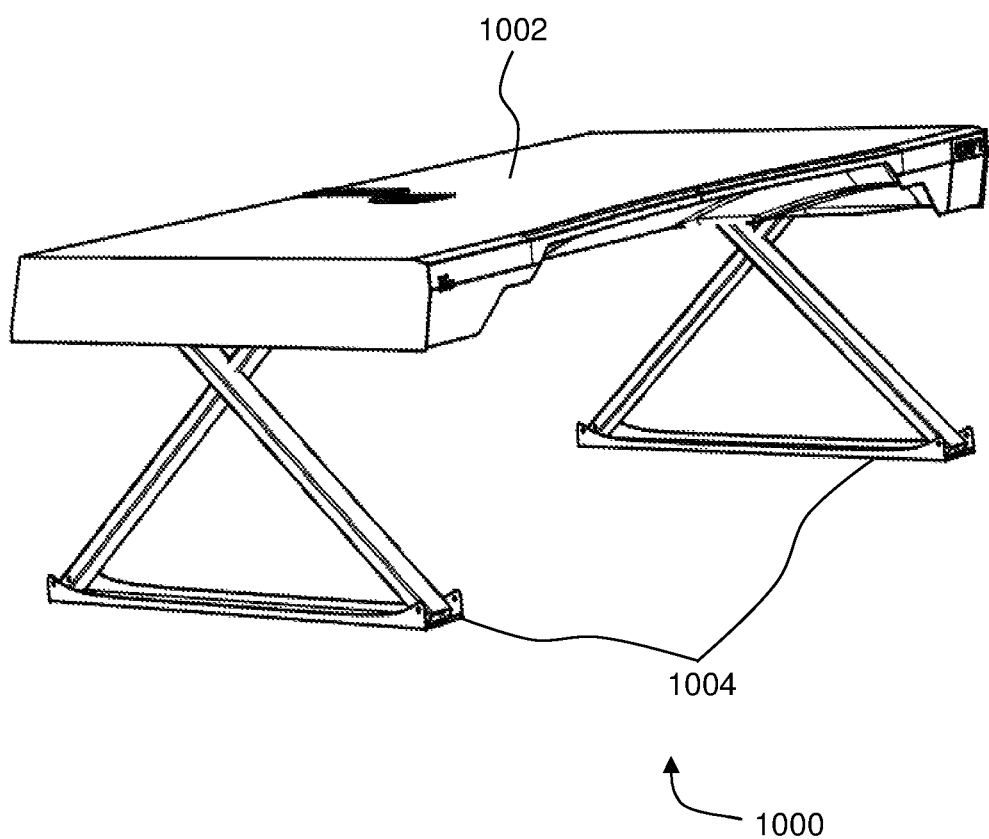
FIG. 10 is a perspective view of a computer comprising a set of foldable legs that are partially unfolded in accordance with an embodiment of the present disclosure.

FIG. 10 is a perspective view of a computer 1000 comprising a set of foldable legs 1004 that are partially unfolded in accordance with an embodiment of the present disclosure. The set of foldable legs 1004 are connected to a desk portion 1002 of the computer 1000. The desk portion 1002 that comprises a first part and a second part are in a fully open position.

Figure 11:
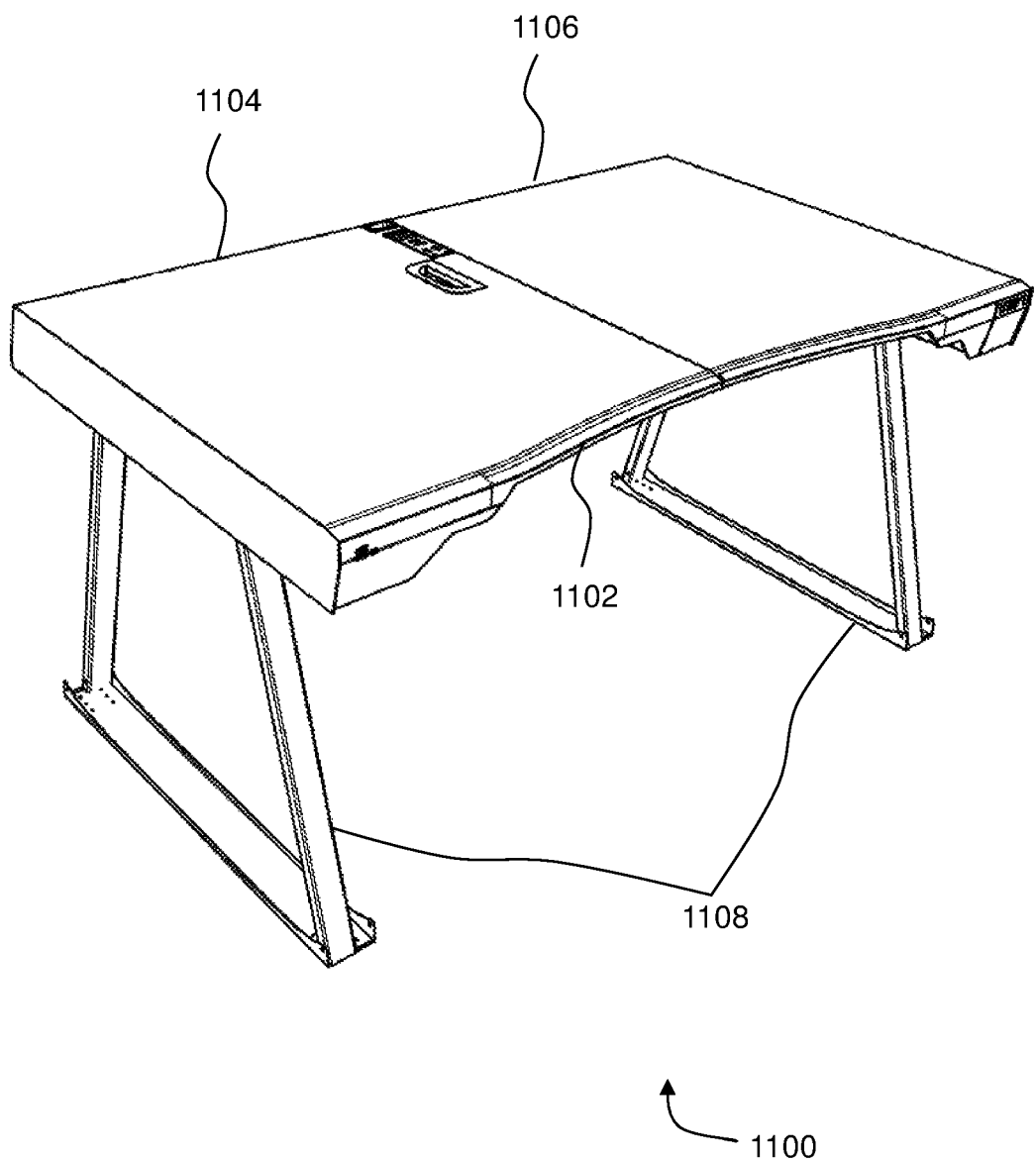
FIG. 11 is a perspective view of a computer comprising a desk portion that is in a second operational state in accordance with an embodiment of the present disclosure.

FIG. 11 is a perspective view of a computer 1100 comprising a desk portion 1102 that is in a second operational state in accordance with an embodiment of the present disclosure. The computer 1100 comprises a set of foldable legs 1108. The desk portion 1102 comprises a first part 1104 and a second part 1106. In the second operational state, the first part 1104 and the second part 1106 of the desk portion 1102 are in an open position with respect to each other, and the set of foldable legs 1108 are unfolded.

Figure 12:
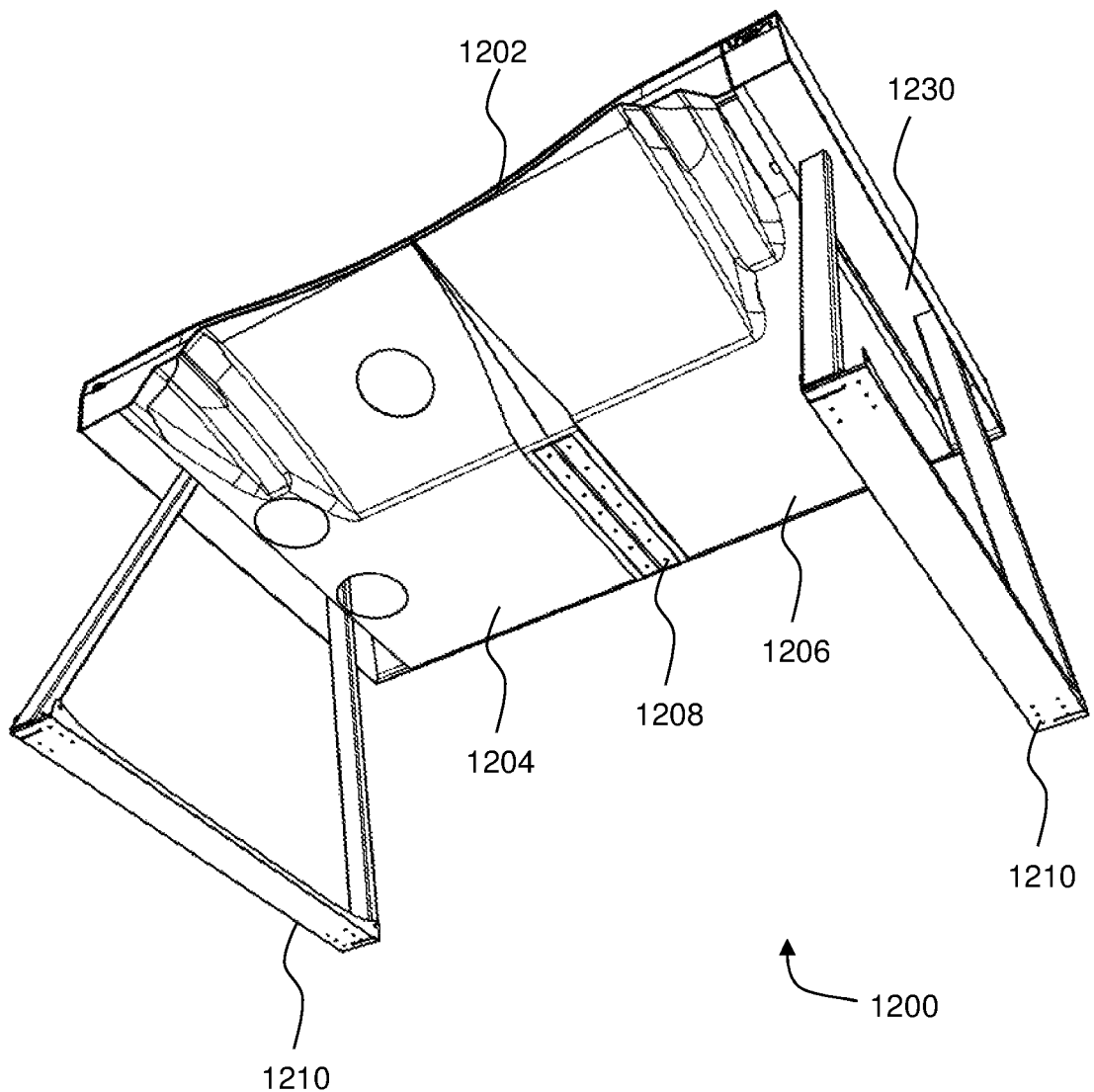
FIG. 12 is a bottom view of a computer comprising a desk portion that is in a second operational state in accordance with an embodiment of the present disclosure.

FIG. 12 is a bottom view of a computer 1200 comprising a desk portion 1202 that is in a second operational state in accordance with an embodiment of the present disclosure. The desk portion 1202 comprises a first part 1204, a second part 1206 and a hinge 1208. The computer 1200 further comprises a set of foldable legs 1210. The function and arrangement of these parts are as has been described above.

Figure 13:
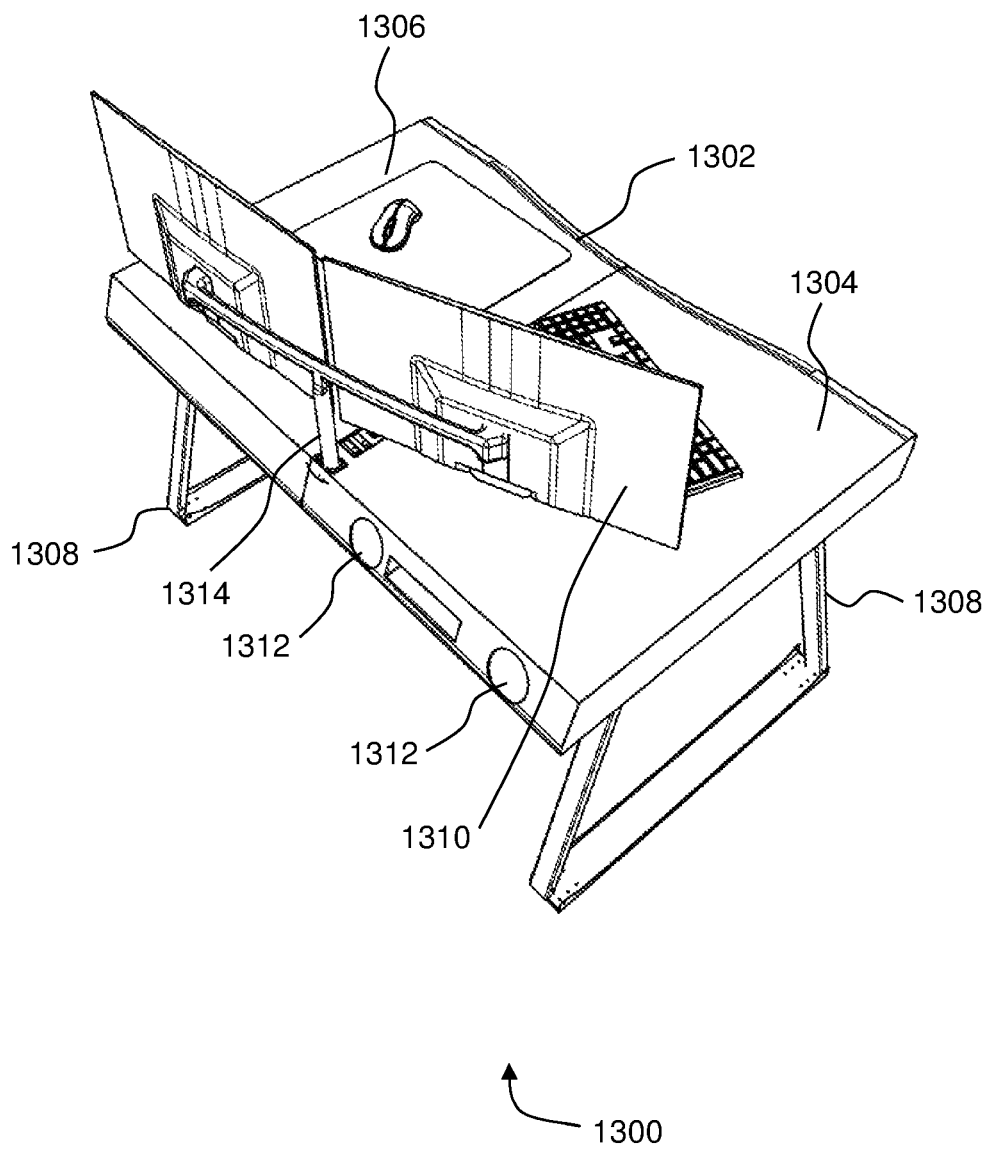
FIG. 13 is a perspective view of a computer comprising a display that is attached to a first part of a desk portion in accordance with an embodiment of the present disclosure.

FIG. 13 is a perspective view of a computer 1300 comprising a display 1310 that is attached to a first part 1304 of a desk portion 1302 in accordance with an embodiment of the present disclosure. The computer 1300 comprises the desk portion 1302, a set of foldable legs 1308 and attachment means 1314. The desk portion 1302 comprises the first part 1304 and a second part 1306. The set of foldable legs 1308 are fully unfolded to support the desk portion 1302. The first part 1304 of the desk portion 1302 comprises at least one output for air 1312 at a rear side of the first part 1304. The display 1310 is releasably attached with the desk portion 1302 of the computer 1300 by the attachment means 1314.

Figure 14:
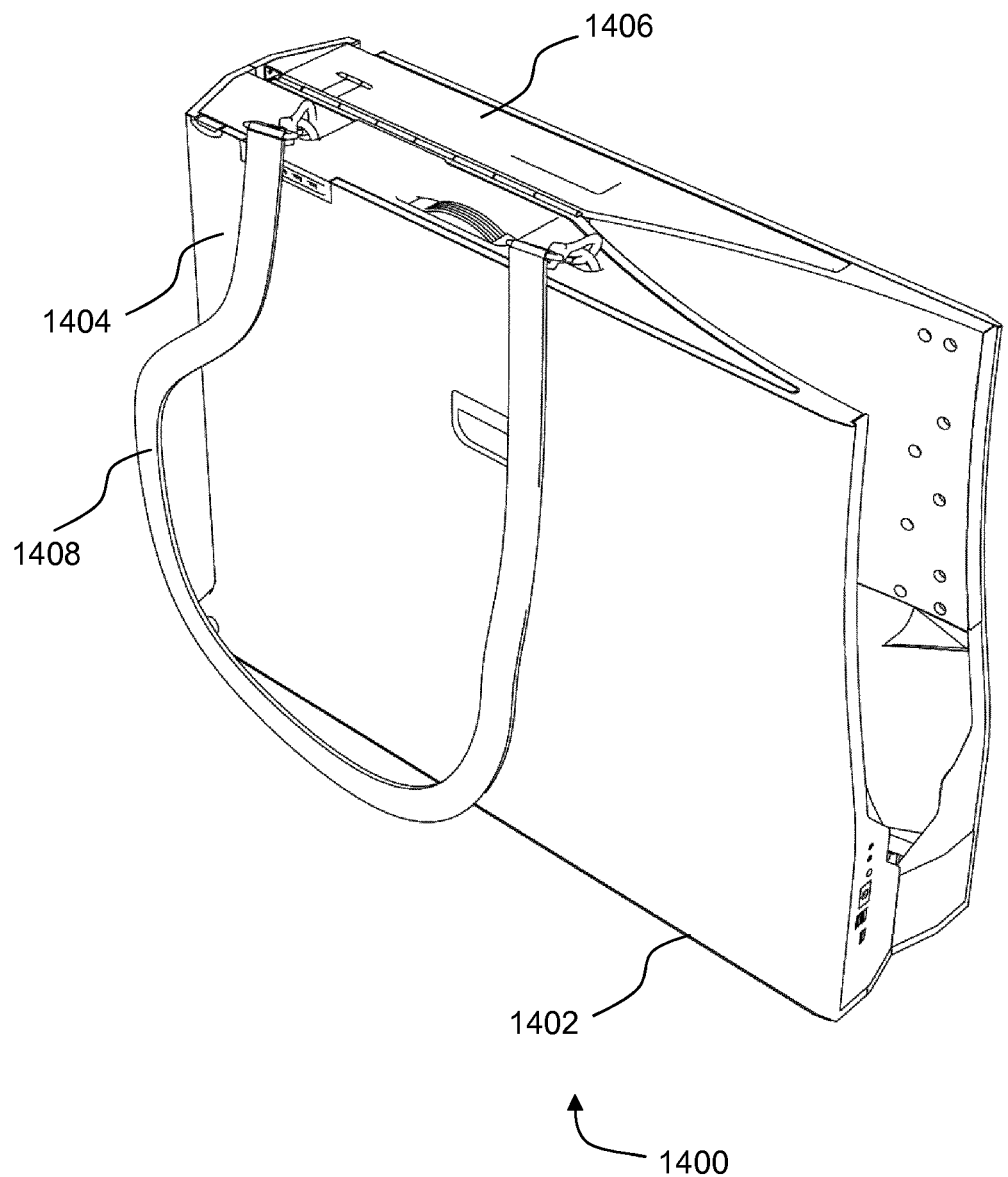
FIG. 14 is a perspective view of a computer comprising a desk portion that is in a first operational state in accordance with an embodiment of the present disclosure.

FIG. 14 is a perspective view of a computer 1400 comprising a desk portion 1402 that is in a first operational state in accordance with an embodiment of the present disclosure. The desk portion 1402 comprises a first part 1404 and a second part 1406. The function and arrangement of the first part 1404 and the second part 1406 are as has been described above. The desk portion 1402 comprises a handle 1408 that is, in this embodiment, attached to the first part 1404 of the desk portion 1402 to carry the computer 1400 from one place to another.

Figure 15:
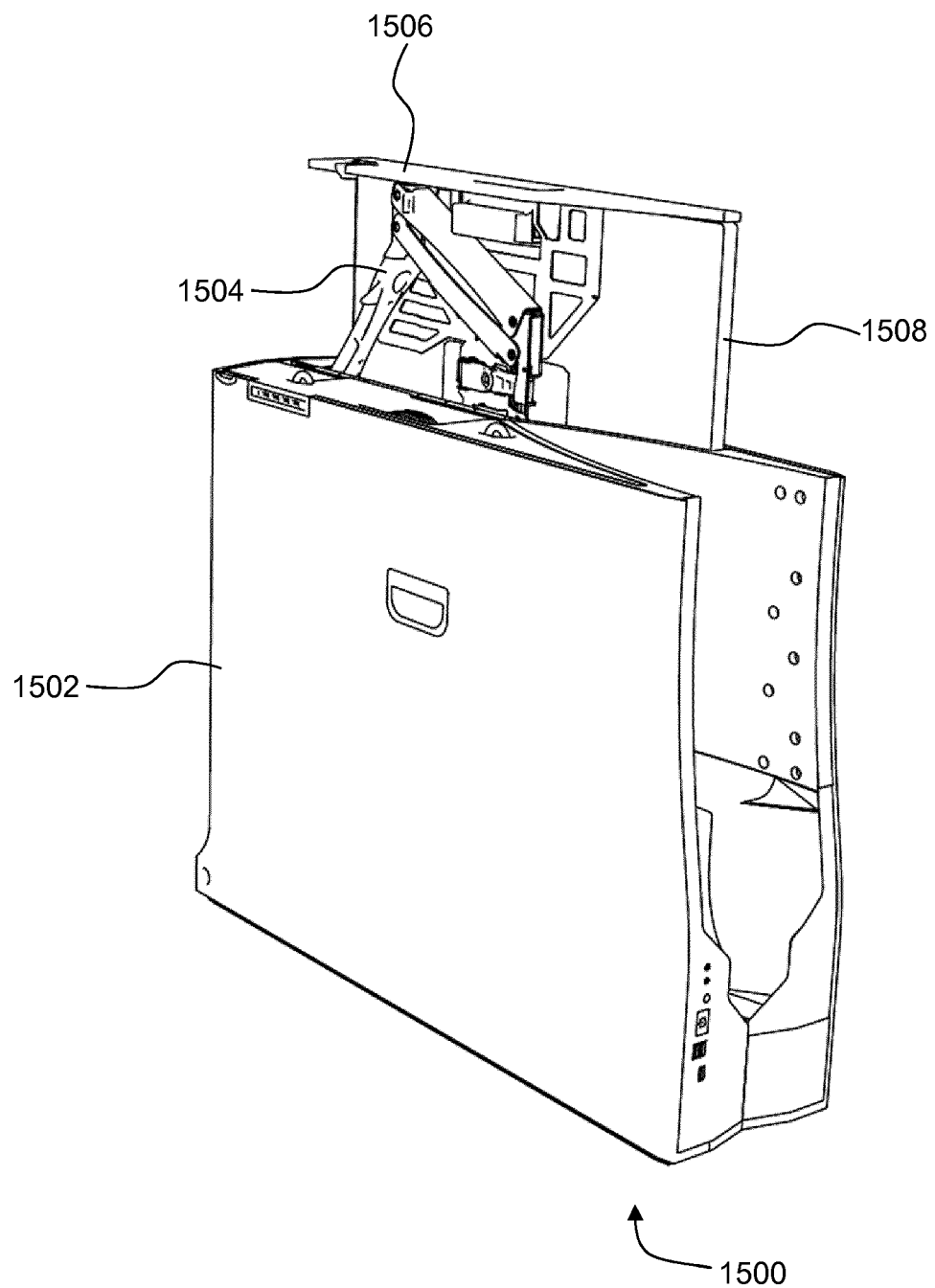
FIG. 15 is a perspective view of a computer comprising a desk portion that is in a first operational state and a foldable display unit that is in a partially unfolded state in accordance with an embodiment of the present disclosure.

FIG. 15 is a perspective view of a computer 1500 comprising a desk portion 1502 that is in a first operational state and a foldable display unit that is in a partially unfolded state in accordance with an embodiment of the present disclosure. The foldable display unit comprises a foldable arm 1504, a cover 1506 and a display 1508. The foldable arm 1504 comprises a first end and a second end. The first end of the foldable arm 1504 is attached to the display 1508 and the second end of the foldable arm 1504 is attached the desk portion 1502 of the computer 1500. The cover 1506 is attached to the first end of the foldable arm 1504 for locking the display 1508 inside a cavity of the desk portion 1502.

Figure 16:
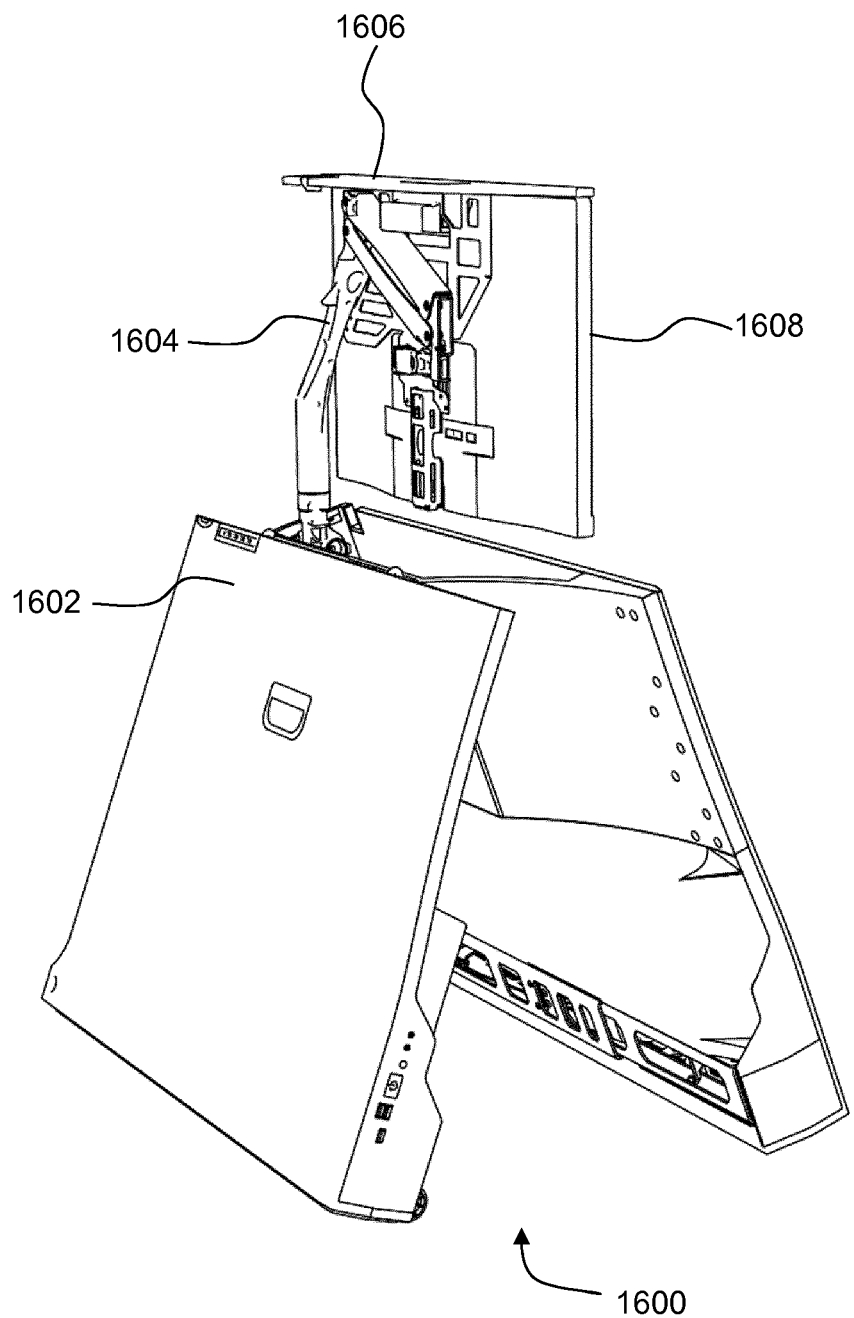
FIG. 16 is a perspective view of a computer comprising a desk portion that is in a partially open position and a foldable display unit that is in an unfolded state in accordance with an embodiment of the present disclosure.

FIG. 16 is a perspective view of a computer 1600 comprising a desk portion 1602 that is in a partially open position and a foldable display unit that is in an unfolded state in accordance with an embodiment of the present disclosure. The foldable display unit comprises a foldable arm 1604, a cover 1606 and a display 1608. The foldable display unit is unfolded/expanded out from a cavity of the desk portion 1602 when pressing a locking means (e.g. a retractable push button) in the cover 1606. The function and arrangement of these parts are as has been described above.

Figure 17:
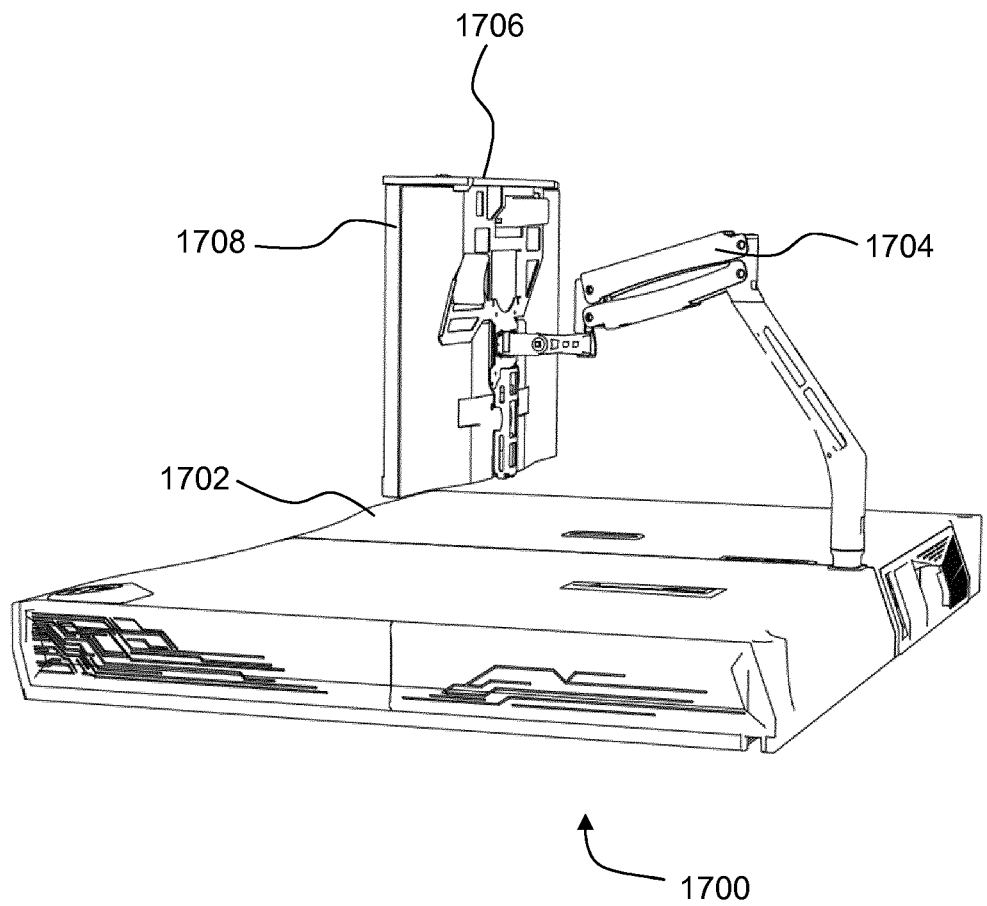
FIG. 17 is a perspective view of a computer comprising a desk portion that is in an open position and a foldable display unit that is in an unfolded state in accordance with an embodiment of the present disclosure.

FIG. 17 is a perspective view of a computer 1700 comprising a desk portion 1702 that is in an open position and a foldable display unit that is in an unfolded state in accordance with an embodiment of the present disclosure. The foldable display unit comprises a foldable arm 1704, a cover 1706 and a display 1708. The display 1708 is pivotally attached to a first end of the foldable arm 1704. The function and arrangement of these parts are as has been described above.

Figure 18:
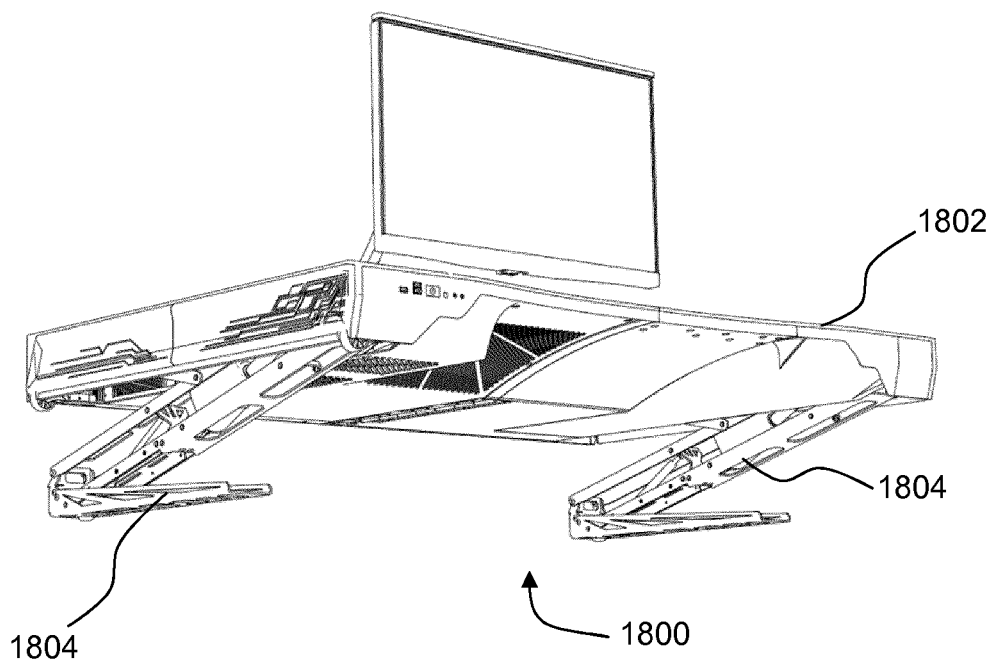
FIG. 18 is a perspective view of a computer comprising a pair of electric legs that are partially unfolded in accordance with an embodiment of the present disclosure.

FIG. 18 is a perspective view of a computer 1800 comprising a pair of electric legs 1804 that are partially unfolded in accordance with an embodiment of the present disclosure. The pair of electric legs 1804 are connected to a desk portion 1802 of the computer 1800 for supporting the desk portion 1802 and for adjusting a height of the desk portion 1802.

Figure 19:
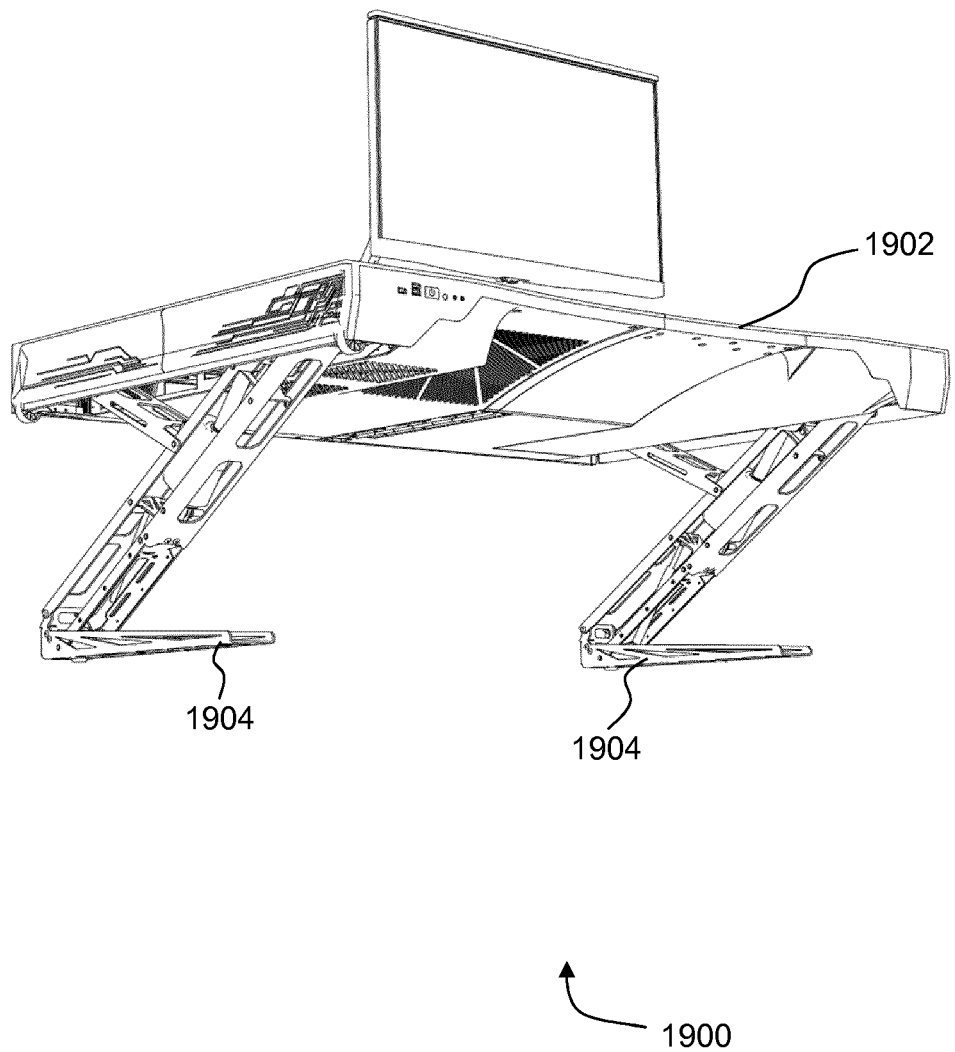
FIG. 19 is a perspective view of a computer comprising a desk portion that is in a second operational state and a pair of electric legs that are fully unfolded in accordance with an embodiment of the present disclosure.

FIG. 19 is a perspective view of a computer 1900 comprising a desk portion 1902 that are in a second operational state and a pair of electric legs 1904 that are fully unfolded in accordance with an embodiment of the present disclosure. In the second operational state, a first part and a second part of the desk portion 1902 are in an open position with respect to each other, and the pair of electric legs 1904 are unfolded for supporting the desk portion 1902.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A computer comprising
a desk portion comprising a first part and a second part pivotally connected to each other;
a set of foldable legs connected to the desk portion; and
a computer hardware integrated into the desk portion by damping means;
the desk portion has a first operational state when the first part and the second part are in a closed position with respect to each other and the foldable legs are folded, and
the desk portion has a second operational state when the first part and the second part are in an opened position with respect to each other and the foldable legs are unfolded;
wherein the computer is arranged to be used for computing in the first operational state and in the second operational state.

2. The computer according to claim 1, wherein the first part of the desk portion comprises at least one input for air and at least one output for air.

3. The computer according to claim 2, wherein the output for air is positioned on opposite side of the first part of the desk portion with respect to the input for air.

4. The computer according to claim 1, wherein the computer hardware comprises at least one of a motherboard for computer, at least one fan, a power supply, at least one input and at least one output.

5. The computer according to claim 1, wherein the first part of the desk portion comprises attachment means for the computer hardware and the second part of the desk portion comprises a storage space for storing accessories and a display.

6. The computer according to claim 1, wherein in the first operational state, the set of foldable legs are folded inside a volume formed by the first part and the second part when in the closed position.

7. The computer according to claim 1, wherein the set of foldable legs comprises a linear guideline for unfolding the set of foldable legs to support the desk portion.

8. The computer according to claim 7, further comprising a set of tension springs for helping the linear guideline to unfold the set of foldable legs.

9. The computer according to claim 1, wherein the computer further comprises attachment means for releasably attaching a display.

10. The computer according to claim 1, wherein the computer comprises a foldable display unit integrated into the desk portion, wherein the foldable display unit comprises
a display;
a foldable arm comprising a first end and a second end, wherein the first end of the foldable arm is attached to the display and the second end of the foldable arm is attached to the desk portion; and
a cover attached to the first end of the foldable arm for locking the display inside a cavity of the desk portion.

11. The computer according to claim 1, wherein the set of foldable legs comprises a pair of electric legs, wherein the pair of electric legs comprises
an electric motor for folding and unfolding the pair of electric legs; and an electrically adjustable linear guideline, controlled by the electric motor, for adjusting a height of the desk portion.

\* \* \* \* \*